Oct. 3, 1967    J. S. WAPNER    3,344,805
AUTOMATIC FLOW RATE CONTROL SYSTEM
Filed March 24, 1965    3 Sheets-Sheet 1

INVENTOR.
JOSEPH S. WAPNER
BY
ATTORNEY

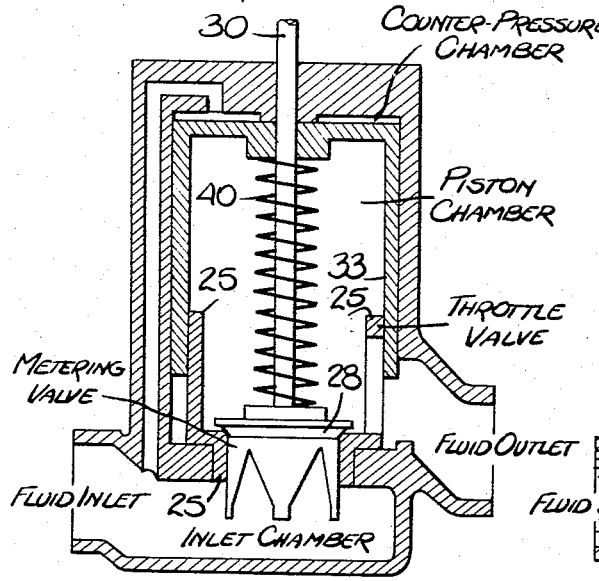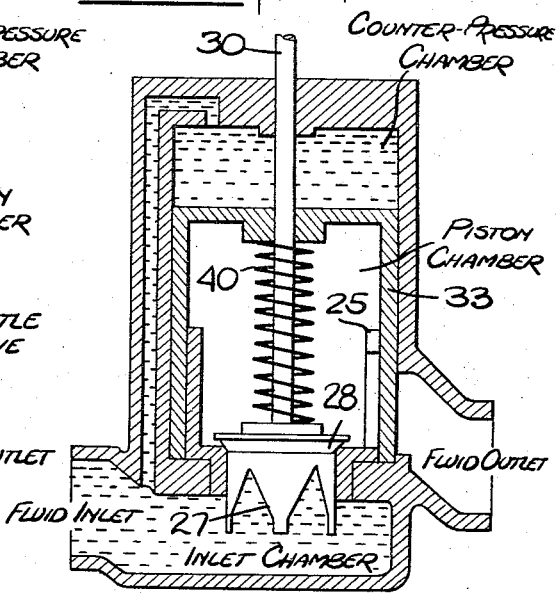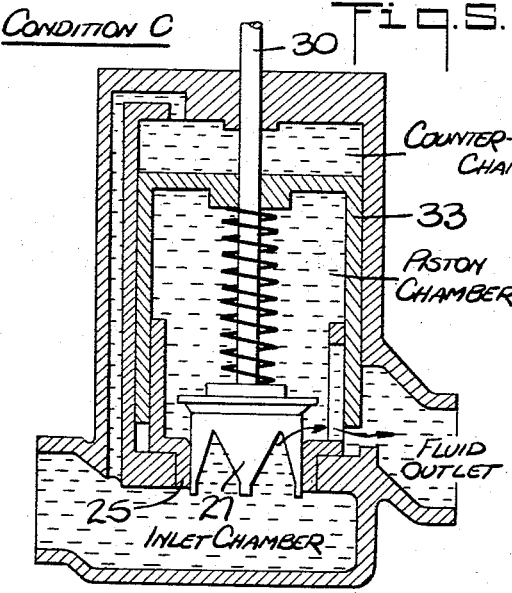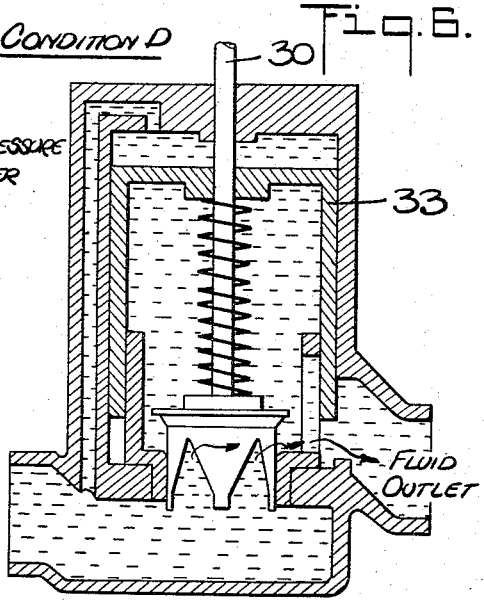

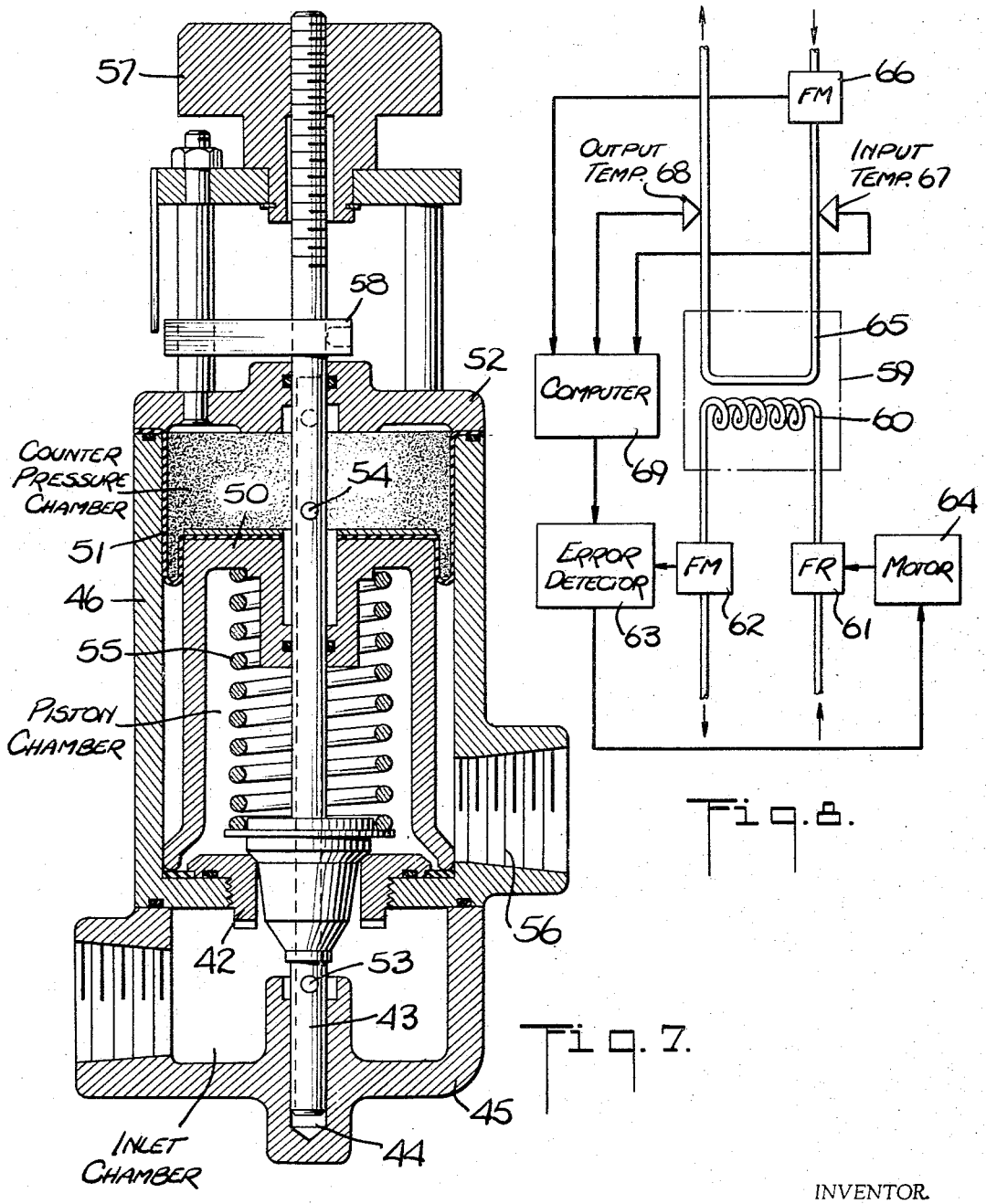

United States Patent Office 3,344,805
Patented Oct. 3, 1967

3,344,805
AUTOMATIC FLOW RATE CONTROL SYSTEM
Joseph S. Wapner, Levittown, Pa., assignor to Fischer & Porter Co., Warminster, Pa., a corporation of Pennsylvania
Filed Mar. 24, 1965, Ser. No. 442,426
10 Claims. (Cl. 137—486)

This invention relates generally to process control systems, and more particularly to an automatic system incorporating a novel flow-rate regulating valve which at a given setting, regardless of variations in supply or discharge pressure, acts to substantially maintain a predetermined constant flow rate, the valve setting being automatically reset by the system to attain the exact flow rate desired.

In a typical process control system, fluid from a supply source is conduced through a control valve into a load. The rate of flow into the load is measured by a flow meter to produce a control signal which is compared in an error detector with a reference signal representing the desired value of flow rate. The detector produces an error signal which is a function of the deviation of the sensed value of flow rate from the desired value.

The error signal is applied to a motor operator functioning to adjust the setting of the control valve until the desired flow value is attained, at which point the error signal is at null. Thus an automatic flow rate control system is an error-sensitive self-correcting, closed-loop arrangement which derives a signal from an output of the process and feeds it back into the process input to effect feedback control.

In a flow control system, two types of disturbances are encountered. The first is a supply disturbance in which there is a change in input pressure resulting, for example, from an increase or decrease in the number of pumps delivering fluid to the system. Second is a demand disturbance resulting in a change in discharge pressure as by reason of a variation in load demand.

In an automatic process control system, a correction for a disturbance cannot be made until its effect is known. But lags in process time introduce a time factor; hence some time must pass before the effect of a disturbance can be sensed by the system. Moreover, the closed-loop system requires a finite time to measure a deviation and to make the necessary correction. As a consequence, not only does it take time before a disturbance can be sensed, but it also takes time to carry out a measurement of the disturbance and to make the required correction therefor, so that even after a correction is introduced, additional time elapses before the effect of the correction can be sensed. Thus effective process control involves not merely measuring and correcting deviations from a desired value, for it must also overcome the effect of time lags that occur around the closed-loop system.

The manner in which an automatic control loop system takes into account the time factors noted above and responds to deviations to effect corrections, is referred to as the "mode of control." The mode in actual use is that resulting from the combined operational characteristics of all functional elements which make up the system.

Modern industrial control systems are usually made to function in one or a combination of control modes. The modes are generally identified as the on-off mode, the single-speed floating mode, the proportional speed floating mode, the proportional position mode, the proportional plus reset mode, and the proportional plus rate mode.

The most commonly used mode is the proportional plus reset mode, which combines the proportional position mode with the single-speed or the proportional speed floating mode. Since one of the significant advantages of the present invention resides in the fact that it becomes possible to attain results equivalent to those realized when operating a system in the proportional plus reset mode, but with a greatly simplified and less expensive arrangement than is ordinarily entailed, a discussion of this combined mode is now in order.

In the proportional position mode, there is a continuous linear relationship within a so-called proportional band between the value of the controlled variable (flow rate) and the setting of the final control element (valve). The proportional band is the change in value of the controlled variable that is necessary to cause full travel of the valve, the band being usually expressed as a percentage of the full range of the valve. In the proportional-position mode, the system responds only to the amount of deviation and is insensitive to the rate or duration of deviation, the valve being caused to move the same amount for each unit of deviation.

It is fundamental that any change in process load calls for a new valve position to correct for it. But the proportional-position mode requires a change in deviation in order to produce a new valve position, and therefore it can produce an exact correction for only one load condition. For all other loads, there is always a residual error, referred to as "offset." This offset error is an inescapable characteristic of the proportional-position mode. To overcome this error, it is the practice to combine the proportional-position mode with a floating mode which has the advantage of continuing to correct valve position until no deviation remains.

In a floating mode, there is a predetermined relation between the deviation and the rate of travel of the valve. The valve moves relatively slowly toward either one or the other of its two extreme positions, depending on whether the deviation is above or below the set point. In the single-speed, floating mode, the valve is caused to move slowly at a single rate regardless of the extent of deviation, whereas in the proportional-speed floating mode, the rate of valve movement is made proportional to devitation, such that the motor slows down as zero deviation is approached. Proportional-speed floating control responds to both the amount and time duration of the deviation and continues to operate until it produces an exact correction for any load change.

In the conventional process control system, should a major change in supply or discharge pressure occur, and the system is operative in the proportional plus reset mode, the first consequence of this change is the generation of an error signal of large magnitude, causing the valve to travel rapidly in a direction abruptly reducing the deviation. When the flow rates are considerable, such as in the range of 100 gallons per minute or higher, and the line pressure runs above 100 pounds per square inch, with valves of standard design enormous torques must be developed in order for the motor operator to drive the valve against the large fluid input pressures encountered in this range.

Thus the servo mechanism for valve control must be capable of exerting the necessary force to bring about a rapid change in the position of a valve subject to high pressures. The heavy-duty servo systems necessarily entailed by this requiement are relatively cumbersome, complex, and expensive. When, however, a gross correction in the valve setting has been made by the system operating in the proportional-position mode, and the deviation has been sharply reduced but not fully corrected, then the floating mode takes over to make the final and exact correction at a relatively slow rate.

Accordingly, it is the main object of this invention to provide an automatic process control system incorporating a novel flow-rate regulator, the system being capable of precisely maintaining a constant flow rate despite large variations in supply or discharge pressure. The system is useable for process control of steam, clear liquids, slurries or suspensions, and is adapted to control flow rates in excess of 100 g.p.m.

More specifically, it is an object of the invention to provide a system of the above type incorporating a low torque flow rate regulator which internally effects gross corrections in response to line pressure fluctuations to substantially maintain a flow-rate level determined by the setting of the regulator, the regulator setting being adjusted in the floating mode to cause the flow-rate level to attain the precise value desired.

A significant feature of a flow-rate regulator in accordance with the invention is that it combines in a unitary structure a metering valve and a throttle valve, the setting of the metering valve being adjustable to provide an inlet orifice of a given area, the throttle valve having an orifice forming a fluid outlet whose effective area is modulated as a function of changes in supply or discharge pressure to an extent maintaining a substantially constant pressure drop across the inlet orifice of the metering valve whereby the flow rate is held at a substantially constant value.

In this flow-rate regulator, the metering valve is of standard design and is constituted by a stem-operated plug which cooperates with a valve seat. Nevertheless the force necessary to shut this valve is not the heavy force ordinarily necessary to overcome line pressure, for the throttle valve imposes a counter-pressure on the plug, and the required force to operate the plug against line pressure may be supplied by a relatively low-power motor. Hence the power requirements of the servo system to adjust the set point of the metering valve to effect precise adjustment of flow rate are small.

Not only are the torque requirements of the flow regulator very low, but the amount of torque necessary to operate the regulator remains substantially unchanged regardless of the setting of the regulator. In contradistinction, with a conventional valve the more the valve approaches the closed position, the greater the force necessary to operate the valve. But since with the present invention the torque requirement is about the same irrespective of where the regulator is set, the need for valve positioners of the type called for in conventional valve control systems, is obviated.

Moreover, since gross corrections are effected internally in the regulator by the throttle valve, all the motor operator is called upon to do is to function slowly in the floating mode to position the metering valve until the exact flow level is attained. Thus the servo system, while of simple, low-cost and reliable design, is fully as effective as the far more sophisticated controller arrangements usually dictated by conventional control valves.

Briefly stated, the objects of the invention are accomplished in a process control system wherein the flow-rate regulator is interposed between a fluid source and a process, the flow rate at a given line pressure being determined by the setting of the metering valve, gross deviations in flow rate as a result of changes in line pressure being substantially corrected by the throttle valve. The flow rate in the system is measured and compared with a reference value to produce an error voltage which is applied to a motor-operator functioning in the floating mode and coupled to the metering valve of the regulator to effect a final correction.

The setting of the regulator is adjusted with respect to the reference value. Consequently it becomes possible to cascade the control system whereby other variables in the process such as temperature or viscosity, may be sensed, the reference value being varied as a function of the sensed variable to provide a new set point producing a flow rate condition maintaining a desired temperature or viscosity.

For a better understanding of the invention, as well as other objects and further features thereof, reference is made to the following detailed description to be read in conjunction with the accompanying drawings, wherein:

FIG. 3 is a simplified schematic presentation of the regulator in a condition where the metering valve is closed and no fluid is present in the inlet line;

FIG. 4 shows the regulator with the metering valve still closed, but with fluid in the inlet line;

FIG. 5 shows the regulator with the metering valve open at a given setting and with a relatively high line pressure;

FIG. 6 shows the regulator with the metering valve open at the same setting, but with a reduced line pressure;

FIG. 7 is a sectional view of another preferred embodiment of the invention; and FIG. 8 is a block diagram of a cascade control system in accordance with the invention.

THE PROCESS CONTROL SYSTEM

Figure 1:
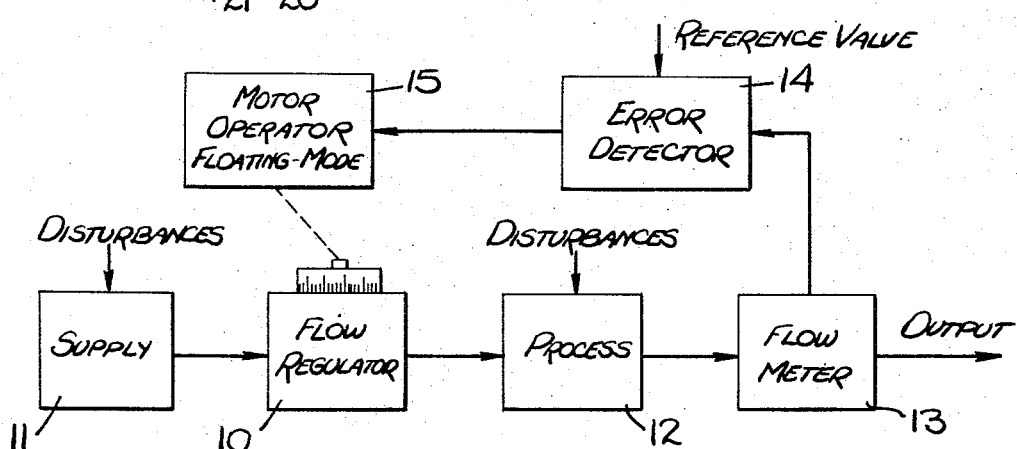
FIG. 1 is a block diagram of a fluid control system in accordance with the invention.

Referring now to the drawings, and more particularly to FIG. 1, there is shown the functional elements of an automatic fluid control system incorporating a flow-rate regulator 10 in accordance with the invention, the elements being shown in their relation to the closed loop of control. Fluid from a suitable supply source 11 is conducted through regulator 10 to a process 12 of any industrial type making use of the fluid, the fluid then passing through a flow meter 13 to the output. The nature of the process forms no part of the invention, and the fluid may be in any form, such as steam, liquid, acid, slurry, or suspension.

The flow rate measured by meter 13 provides a control signal which is applied to an error detector 14 which compares the control signal with a reference signal representative of the desired value of flow rate. In the event a difference arises between the control and reference signals, an error signal is generated which is applied to a motor-operator 15 functioning in the floating mode and acting in response to the error signal to adjust the regulator 10 until a point is reached where the flow rate is restored to the desired value, and the error signal is at null.

Thus flow meter 13 is directly sensitive to the controlled variable, which is flow rate. Disturbances in flow rate may occur due to pressure changes in the demand in the process 12 (downstream) or in the fluid supplied to the regulator (upstream). In practice, flow meter 13 may be a magnetic flow meter adapted to measure the volume rate of fluids which are difficult to handle, such as corrosive acids, detergents, slurries, etc.

Error detector 14, for purposes of the present invention, may simply be a relay operating in conjunction with a comparison amplifier and arranged to provide a first relay switching action when the control signal from the flow meter is higher than the reference signal, thereby indicating that the flow rate is above the desired value, and to provide a second and opposing switching action when the control signal is below the level of the reference signal, thereby indicating that the flow rate is below the desired value. The relay assumes a neutral position in the absence of an error signal. The actual amount of deviation will be relatively small in either direction, for gross corrections are made internally by the regulator 10.

The motor-operator 15 may be electrical, hydraulic, or pneumatic, and when actuated by the error signal, serves to effect a fine correction in the setting of the regulator, thereby restoring the desired flow rate. Since in the example given, the error signal provides a first or second switching action, depending on whether the flow rate is above or below the desired level, the motor-operator in its simplest form, may be a slow-speed reversible electric motor which is operated by the relay of the error detector to turn in one direction in response to the first switching action, and to turn in the reverse direction in response to the second switching action. In the neutral position of the relay, the motor is inactive, for in this position the error signal is at a null.

The internal structure of the flow regulator, as will be explained in detail in connection with the succeeding figures, automatically corrects for gross changes in flow rate. The regulator setting is such as to provide the desired flow rate at a given setting for a predetermined line pressure. When there is a change in line pressure, the regulator carries out the major correction necessary to substantially maintain the original flow rate. Consequently, where in a conventional process control system having a standard control valve, the system operates in the proportion-position mode to effect gross correction, such correction is carried out by the internal structure of the regulator.

Hence all that remains to be done is a fine correction to bring the flow rate to its precise value. This is accomplished by an electric motor 15 which slowly turns in the floating mode under the control of the error-detector relay until the desired flow rate is established.

In actual practice, when using a relatively slow-speed reversible motor arrangement, the switching arrangement may be provided with a narrow neutral zone whereby deviation is reduced to almost zero, while overshooting of the motor is prevented.

It is also to be noted that in doing away with the proportional bands in the control system, the offset error introduced by the limitations inherent in proportional position control is eliminated and the flow regulator more closely approaches the ultimate value. Hence the floating mode control is called upon to carry out a smaller correction than would be necessary if it were coupled with proportional position control.

THE FLOW RATE REGULATOR

Figure 2:
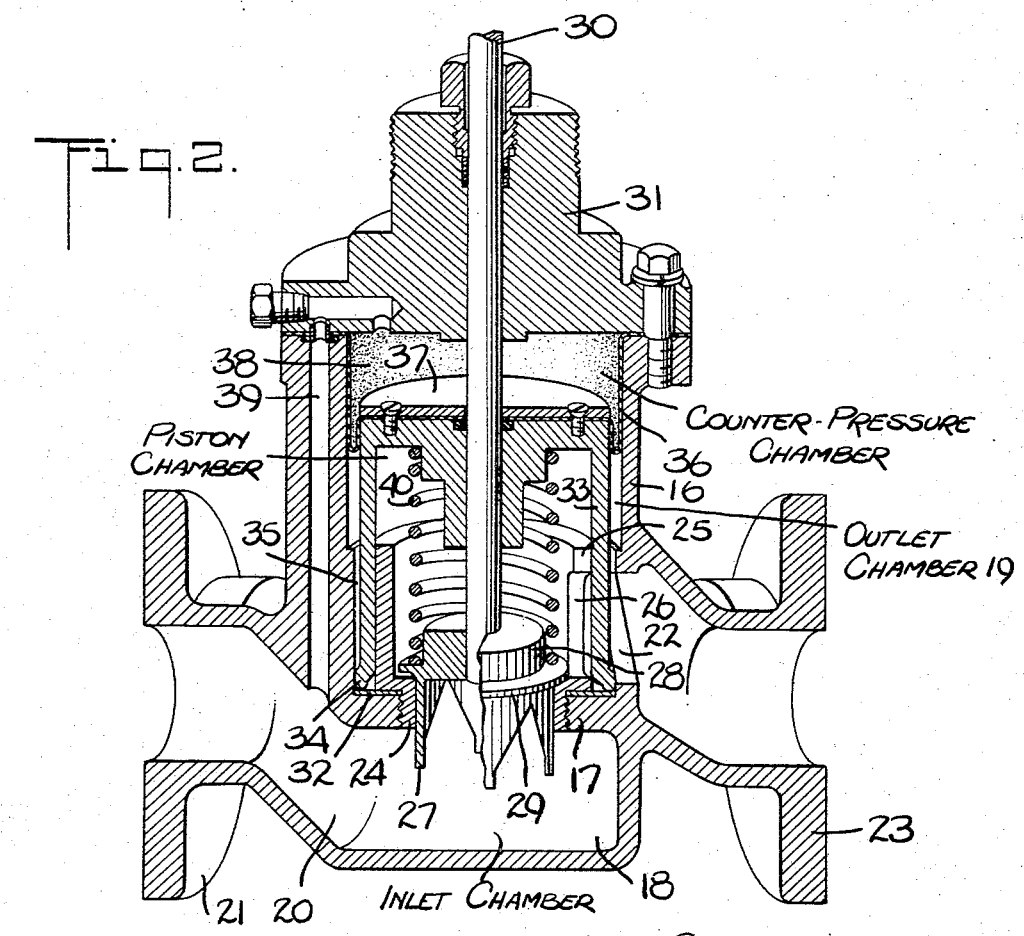
FIG. 2 is a sectional view of an embodiment of a flow-rate regulator in accordance with the invention.

Referring now to FIG. 2, there is shown a flow-rate regulator in accordance with the invention, the regulator comprising a generally cylindrical hollow casing 16. The casing is divided by a transverse partition 17 into a lower inlet chamber 18 and an upper outlet chamber 19. Communicating with inlet chamber 18 through an inlet port 20 is an inlet coupling 21, and communicating with outlet chamber 19 through outlet port 22 is an outlet coupling 23. Threadably received in a central opening in partition 17 is a valve seat 24, the seat being provided with an upwardly-extending tubular sleeve 25 having a lateral port opening 26 in registration with outlet port 22. A sealing ring 32 preferably of Teflon, is interposed between the upper surface of partition 17 and the lower end of sleeve 25.

Slidably accommodated within seat 24 is the skirt 27 of a valve plug 28, having a circular flange 29 which when the plug is closed, rests on top of seat 24. The position of the plug is manipulated by means of a stem 30 which extends upwardly through a valve bonnet 31, stuffing being provided to prevent leakage. The axial position of stem 30 determines the extent to which the plug is raised, and the position of stem 30 may be set by conventional valve control mechanisms.

Telescopically received over the valve sleeve 25 is a cylindrical piston 33 whose open lower end is provided with an annular shoulder 34, the outer diameter of the shoulder being substantially equal to the inner diameter of the casing 16, whereby an annular space 35 is defined between the inner wall of the casing and the outer wall of the piston. In operation, the annular space is filled with fluid to provide a uniform distribution of pressure against the piston, thereby avoiding lateral stresses tending to cause the piston to bind against the sleeve.

A rolling diaphragm 36, preferably of the type known commercially as "Bellofram" is attached between the closure 37 at the upper end of the piston and the bonnet 31, to define a counter-pressure chamber 38 in the upper portion of the outlet chamber. Inlet chamber 18 communicates with the counter-pressure chamber 38 through a fluid duct 39 passing through the wall of casing 16, whereby fluid admitted into the inlet chamber also flows into the counter-pressure chamber.

A compressing spring 40 surrounds stem 30 within the piston 33, the lower end of the spring engaging flange 29 on the valve plug 28, the upper end of the spring engaging the closure 37 of the piston. Thus the regulator has a concentric arrangement, with the stem 30 occupying the axial position, the stem being surrounded in successive order by valve plug 28, spring 40, sleeve 25, piston 33, and casing 16. It will be noted that when the valve plug 28 is raised, the spring is likewise elevated.

Plug 28 in conjunction with seat 24 constitutes the metering valve of the regulator. The skirt 27 of the valve plug has straight-sided V-ports cut therein. The flow versus valve-opening relationship of a metering valve having straight-sided V-ports is $Q=Ky^2$, where Q is flow at constant pressure drop, y is the valve opening, and K is a constant. This is the equation for a parabola, and this characteristic is therefore sometimes designated as "parabolic." For practical purposes, this characteristic of a straight-sided V-port can be made to approach that of an equal-percentage curve wherein equal increments of stem motion produce equal percentage changes in flow at constant pressure drop based on the flow just before the change is made. Output port 22 also has a V-shaped configuration.

When the metering valve is opened, fluid from inlet chamber 18 is admitted into the interior of piston 33 and is permitted to flow through outlet 22 to an extent determined by the position of piston 33 relative to sleeve 25; the more the piston is raised, the greater the exposure of port 22 in the sleeve. Hence sleeve 25 in conjunction with piston 33 acts as a throttle valve in the outlet of the regulator.

Thus the regulator is constituted by a metering valve whose orifice admits incoming fluid into the piston chamber of the throttle valve, the orifice of the throttle valve determining the discharge of the fluid from the regulator.

OPERATION OF REGULATOR

Referring now to FIGS. 3 to 6, the operation of the regulator will be explained in terms of its behavior in four distinct conditions: namely, condition A where the metering valve is closed and no fluid is in the line; condition B, where the metering valve is still closed but fluid is fed into the regulator; condition C, where the metering valve is open and fluid at a given line pressure is fed into the regulator; and condition D, which is the same as condition C, except that the line pressure has dropped.

*Condition A.*—As shown in FIG. 3, the metering valve formed by the valve plug 28 and seat 25, is closed, and no fluid is in the line. In this circumstance, no fluid enters the counter-pressure chamber above the piston, and the compression spring 40 is unopposed and therefore lifts the piston upwardly to its highest position, thereby opening the throttle valve formed by the piston and sleeve 25 to its fullest extent. Thus in the absence of fluid, with the metering valve closed, the spring acts to open the throttle valve.

*Condition B.*—When fluid is admitted into the regulator, as shown in FIG. 4, and the metering valve is still closed, the fluid enters the counter-pressure chamber and creates a downward pressure overcoming the upwardly-directed pressure of the spring to force the piston all the way down, thereby closing the throttle valve. Thus under normal operating conditions, when the metering valve is closed, fluid entering the counter-pressure chamber forces the throttle valve to close, thereby providing a double fluid lock and minimizing leakage through the regulator.

*Condition C.*—When the metering valve is opened by operation of stem 30 to lift plug 28 above seat 25 to define an orifice whose effective area depends on how high plug 28 is raised relative to the seat, fluid is admitted into the piston chamber as well as to the counter-pressure chamber. The fluid flowing through the metering orifice is reduced in pressure, the pressure difference being a function of the rate of flow, as expressed by the equation $Q = Ky^2$.

Since the pressure on the inlet chamber-side of the metering orifice is greater than the pressure on the piston chamber-side of this orifice, and the counter-pressure chamber is in communication with the inlet chamber, the resultant pressure developed in the counter-pressure chamber which tends to move the piston downwardly, is greater than the pressure within the piston chamber which tends to move it upwardly. But this tendency toward downward movement is overcome by the compression spring 40.

As a consequence, the piston will move upwardly to an extent opening the throttle valve formed by the piston 33 and sleeve 25, until the flow rate which determines the pressure forces tending to move the piston downwardly is balanced by the force of the spring tending to move the piston upwardly.

It will be recognized therefore that the flow rate in the first instance, assuming a given upstream and downstream pressure, is determined by the setting of the metering valve stem. It is important to note that the force required to shut the valve is not the force necessary to overcome the full pressure in the inlet chamber, for the counter-pressure force which is developed is such as to make the force required to close the valve relatively small. Hence in the servo system, a relatively low-power motor is all that is called for in resetting the regulator. Typically, the differential pressure across the metering orifice will be in order of six pounds regardless of the line pressure and regardless of the set position.

*Condition D.*—In condition C, a given line pressure was assumed, and for a given setting of the metering valve, the throttle valve automatically assumed a position appropriate to this setting to create a condition of balance between the spring and the operative fluid pressure forces. If now, as shown in FIG. 6, the line pressure is reduced, the fluid pressure drop across the metering orifice will likewise decrease, and the spring will now shift the piston upwardly to a greater extent until a new condition of balance is attained. Thus, to maintain substantially the same flow rate with reduced line pressure, the throttle valve is opened to a greater extent than in FIG. 5.

Thus with each change in line pressure, the throttle valve will automatically assume a position at which the fluid pressure forces are balanced by the spring force to maintain a flow rate determined by the setting of the metering valve. It is important to note that the spring force is not independent of the metering valve setting, but is adjusted accordingly, for as the plug is raised, the spring is subjected to a degree of compression determined by the extent to which the plug is raised. Hence the bias on the spring or its reference level, is varied as a function of the metering valve setting.

MODIFIED FLOW RATE REGULATOR

Referring now to FIG. 7, there is shown a modified form of flow rate regulator, which operates on essentially the same principles as the regulator in FIG. 2, but which differs therefrom in certain structural details.

In the regulator shown in FIG. 7, the metering valve is constituted by a conical plug 41 received within a valve seat 42, the plug being operated by a stem 43 whose lower end is slidable within a well 44 formed in an inlet cup 45 secured to the base of a casing 46. A lateral fluid inlet coupling 47 communicates with the inlet chamber defined by cup 45, and a lateral fluid outlet coupling 48 communicates with the outlet chamber formed within casing 46.

Slidably disposed within the outlet chamber is a piston 49 having a central opening in its end wall 50 through which the stem 43 extends, a bellows 51 being secured between end wall 50 of the piston and the head-piece 52 of the casing to define the counter-pressure chamber in the upper section of the outlet chamber.

Fluid entering the inlet chamber is admitted into the counter-pressure chamber through a lower bore 53 in the stem, which is hollow, the stem acting as a duct to feed fluid into the counter-pressure chamber via an upper bore 54 in the stem. A compression spring 55 surrounds stem 43 in the piston chamber and is interposed between plug 41 and the upper end wall 50 of the piston.

The throttle valve is constituted by piston 49 which acts in conjunction with the port 56 in the outlet coupling 48 to provide a valve action which depends on the extent to which the piston is raised.

Fluid entering the inlet chamber is fed to the counter-pressure chamber to produce a downwardly-directed force tending to close the throttle valve. When the metering valve is open, the pressure developed in the piston chamber combined with the upwardly-directed force of the compression spring, acts to raise the piston 49 to the point at which the upwardly or downwardly directed forces are balanced, thereby opening the throttle valve to an extent providing a predetermined flow rate for a given orifice area of the metering valve and a given line pressure.

But when the line pressure changes, for the same orifice in the metering valve, the throttle valve will assume a new position of balance, thereby maintaining substantially the same flow rate in the manner described in connection with FIG. 2. The setting of the metering orifice is controlled by a knob 57 attached to one end of stem 43, the stem being threadably received in a bracket piece 58, such that rotation of the knob raises or lowers the valve plug, depending on the direction of rotation.

As explained previously in connection with FIG. 2, the regulator shown in FIG. 6 is adapted automatically to effect gross corrections in flow rate, the final correction being carried out in the floating mode by the motor-operator control loop.

CASCADE CONTROL SYSTEM

In the process control system in FIG. 2, the system is sensitive only to changes in flow rate to effect a correction in the setting of the flow regulator to an extent maintaining a desired flow rate regardless of disturbances in the input supply or in the process.

In some instances, it is desirable because of time lags in the system, to effect corrections before a change in a processing factor can be sensed. For example, in a process involving the heating of a fluid by steam, a change in flow rate of the steam will not immediately show up in the temperature of the fluid heated thereby because of the heat stored in the system. Likewise, a change in the flow rate of the fluid will not be immediately reflected in the fluid temperature. Hence it is necessary, if the temperature of the fluid is to be maintained at a constant level, to anticipate the effect of a change in a process variable on the temperature; or to express it in control system terms, to feel forward the sensed change to effect a correction before the result of the change on the factor being maintained can be detected.

Referring now to FIG. 8, the system is of the cascade type and comprises a heat exchanger 59 having a coiled steam pipe 60 into which steam from a boiler is fed through a flow rate regulator 61 of the type shown in the previous figures. The flow rate of steam is sensed by a flow meter 62 whose reading is applied to an error detector 63, where it is compared with a reference value to produce an error signal. The error signal is applied to a motor-operator 64 which controls the setting of the flow regulator in the manner described previously.

The heat exchanger 59 includes a fluid line 65 in heat exchange relationship with the steam coil 60, fluid which may, for example, be oil or liquid being fed therein through a flow meter 66. The temperature of the unheated liquid fed into the line is measured by a temperature sensor 67 and the temperature of the heated liquid leaving the heat exchanger is measured by temperature sensor 68.

If, as in the case of FIG. 2, we assume that the only significant change encountered in operation is a change in the steam flow rate as a result of pressure variations in the steam system, then with a given reference value applied to the error detector 63, the flow regulator will be corrected in the floating mode to maintain the desired flow rate.

But in practice, the disturbances may arise in the fluid line rather than in the steam line. Since it is the temperature of the fluid in this line which is the value to be maintained at constant level, changes which affect this value must be sensed and forwarded to the error detector. To this end, the reference value in the error detector 63 is manipulated by means of a computer 69 as a function of the variables in the fluid line, namely, the input temperature, the flow rate and the output temperature.

The computer, which may be in digital, analog or any other form, responds to the variables in the fluid line to adjust the reference value. The flow rate in the steam line is compared with the adjusted reference value to produce a steam flow rate which when the input temperature of the fluid in the fluid line goes up or down, the amount of steam fed into the system will be corrected to maintain a constant temperature in the fluid line. Or if the flow rate of fluid in the fluid line changes, the steam rate will be adjusted accordingly. Thus if any condition in the overall process system changes, a correction is effected even before a change in output temperature is detected, thereby preventing a temperature change from taking place.

While there have been shown and described preferred embodiments of automatic flow rate control system is accordance with the invention, it will be appreciated that many changes and modifications may be made therein without, however, departing from the essential spirit of the invention as defined in the annexed claims.

What I claim is:

1. A flow rate process control system comprising:
   (A) a low torque flow-rate regulator interposed between a fluid source and a process to control the flow of fluid thereto, said regulator including a metering valve which is settable to provide for a given line pressure a desired flow rate and a throttle valve imposing a counter-pressure on the metering valve and responsive to a deviation in pressure from said given pressure to effect a gross correction substantially maintaining said desired flow rate,
   (B) means to measure the actual flow rate of fluid passing through said process and to compare it with a reference value to produce an error signal depending on the extent and direction of the deviation of the measured value from the reference value, and
   (C) a motor-operator operatively coupled in the floating mode to said metering valve in said regulator and responsive to said error signal to cause the flow rate to assume a value determined by said reference value.

2. A flow rate process control system comprising:
   (A) a low torque flow-rate regulator interposed between a fluid source and a process to control the flow of fluid thereto, said regulator including a metering valve which is settable to provide for a given line pressure a desired flow rate and a throttle valve which responds to a deviation in pressure from said given pressure to effect a gross correction substantially maintaining said desired flow rate,
   (B) means to measure the actual flow rate of fluid passing through said process,
   (C) an error detector to compare the measured value with a reference value representative of said desired rate to produce an error signal depending on the extent and direction of the deviation which remains after said cross correction is effected, and
   (D) a motor-operator coupled to said metering valve in said regulator and responsive to said error signal and functioning in the floating mode to effect a final and precise correction causing the flow rate to assume the desired value.

3. A flow rate process control system comprising:
   (A) a low torque flow-rate regulator interposed between a fluid source and a process to control the flow of fluid thereto, said regulator including a metering valve which is settable to provide for a given line pressure a desired flow rate, said metering valve operating in conjunction with a throttle valve which responds to a deviation in pressure from said given pressure to effect a gross correction substantially maintaining said desired flow rate,
   (B) a flow meter in the output of said process to measure the actual flow rate of fluid passing therethrough,
   (C) an error detector coupled to said flow meter to compare the measured value with a reference value representative of said desired rate to produce an error signal depending on the extent and direction of the deviation which remains after said gross correction is effected, and
   (D) a motor-operator coupled to said metering valve and responsive to said error signal and functioning in the floating mode to effect a final and precise correction causing the flow rate to assume the desired value.

4. A system as set forth in claim 3, wherein said motor-operator is constituted by a reversible motor and said error detector includes a relay providing a first switching action causing said motor to turn in one direction when the error signal indicates a pressure drop below the desired value and a second switching action causing the motor to turn in the other direction when the error signal indicates a pressure rise above the desired value.

5. A fluid rate regulator providing a substantially constant flow rate regardless of changes in line fluid pressure, comprising:
   (A) a casing divided by a wall into an inlet chamber and an outlet chamber, said inlet chamber having a port therein to admit fluid into the regulator, said outlet chamber having a port therein to discharge fluid therefrom,
   (B) a metering valve to control fluid flow between the inlet and outlet chambers and having a valve seat mounted in said wall, a plug receivable in said seat, and means to set the position of said plug to define an inlet orifice,
   (C) a throttle valve having a piston slidably disposed within said outlet chamber, said piston having a closure at the upper end thereof and the interior of said piston forming a piston chamber, the space above the closure forming a counter-pressure chamber, said piston being displaceable from a down position against said wall wherein fluid admitted into said piston chamber when said plug is raised is prevented from flowing into said outlet port, to an up position wherein said fluid is free to flow into said outlet port thereby to define an adjustable outlet orifice whose area is determined by the piston position,
   (D) a compression spring disposed in said piston chamber between said plug and said closure to provide a force tending to move said piston to said up position, and
   (E) means to conduct fluid from said inlet chamber to said counter-pressure chamber to provide a force tending to move said piston to the down position against the force of said spring and the fluid pressure in said piston chamber, said spring having a characteristic causing said piston, for any given fluid pressure to assume a position at which the fluid forces and the spring forces are balanced.

6. A fluid rate regulator providing a substantially constant flow rate regardless of changes in line fluid pressure, comprising:
   (A) a casing divided by a wall into an inlet chamber and an outlet chamber, said inlet chamber having a port therein to admit fluid into the regulator, said outlet chamber having a port therein to discharge fluid therefrom,
   (B) a metering valve to control fluid flow between the inlet and outlet chambers and having a valve seat mounted in said wall, a plug receivable in said seat, and a stem attached to said plug to set the position thereof to define an inlet orifice,
   (C) a throttle valve having a piston slidably disposed within said outlet chamber, said piston having a closure at the upper end thereof, said stem of said metering valve extending upwardly through said closure, the interior of said piston forming a piston chamber, the space above the closure forming a counter-pressure chamber, said piston being displaceable from a down position against said wall wherein fluid admitted into said piston chamber when said plug is raised is prevented from flowing into said outlet port, to an up position wherein said fluid is free to flow into said output port thereby to define an adjustable outlet orifice whose area is determined by the piston position,
   (D) a compression spring disposed in said piston chamber between said plug and said closure and surrounding said stem to provide a force tending to move said piston to said up position, and
   (E) means to conduct fluid from said inlet chamber to said counter-pressure chamber to provide a force tending to move said piston to the down position against the force of said spring and the fluid pressure in said piston chamber, said spring having a characteristic causing said piston, for any given fluid pressure to assume a position at which the fluid forces and the spring forces are balanced.

7. A regulator as set forth in claim 6, wherein said means to conduct fluid into said counter-pressure chamber is formed by a duct in said casing.

8. A regulator as set forth in claim 6, wherein said means to conduct fluid into said counter-pressure chamber is formed by a passage through said stem.

9. A flow rate process control system comprising:
   (A) a fluid rate regulator providing a substantially constant flow rate regardless of changes in line fluid pressure between a fluid source and a process to control the flow of liquid thereto, said regulator including
      (a) a casing divided by a wall into an inlet chamber and an outlet chamber, said inlet chamber having a port therein to admit fluid into the regulator, said outlet chamber having a port therein to discharge fluid therefrom,
      (b) a metering valve to control fluid flow between the inlet and outlet chambers and having a valve seat mounted in said wall, a plug receivable in said seat, and means to set the position of said plug to define an inlet orifice,
      (c) a throttle valve having a piston slidably disposed within said outlet chamber, said piston having a closure at the upper end thereof, the interior of said piston forming a piston chamber and the space above the closure forming a counter-pressure chamber, said piston being displaceable from a down position against said wall wherein fluid admitted into said piston chamber when said plug is raised is prevented from flowing into said outlet port, to an up position wherein said fluid is free to flow into said outlet port thereby to define an adjustable outlet orifice whose area is determined by the piston position,
      (d) a compression spring disposed in said piston chamber between said plug and said closure to provide a force tending to move said piston to said up position, and
      (e) means to conduct fluid from said inlet chamber to said counter-pressure chamber to provide a force tending to move said piston to the down position against the force of said spring and the fluid pressure in said piston chamber, said spring having a characteristic causing said piston, for any given fluid pressure to assume a position at which the fluid forces and the spring forces are balanced to correct for a gross deviation in line pressure,
   (B) means to measure the actual flow rate of fluid passing through said process with a reference value representative of a desired rate to produce an error signal depending on the extent and direction of the deviation which remains after said gross deviation is corrected, and
   (C) a motor-operator coupled to said metering valve and responsive to said error signal to effect a final and precise correction causing the flow rate to assume the desired value.

10. A cascade process control system for establishing a specified condition, comprising:
   (A) a low torque flow-rate regulator interposed between a fluid source and a process to control the flow of fluid thereto, said regulator including a metering valve which is settable to provide for a given line pressure a desired flow rate and a throttle valve which responds to a deviation in pressure from said given pressure to effect a gross correction substantially maintaining said desired flow rate,
   (B) means to measure the actual flow rate of fluid passing through said process,
   (C) means to measure the value of said condition,
   (D) an error detector to compare the measured flow rate value with a reference value to produce an error signal depending on the difference therebetween,
   (E) means to adjust said reference value as a function of the measured value of said condition, and
   (F) a motor-operator coupled to said metering valve in said regulator and responsive to said error signal and functioning in the floating mode to cause the flow rate to assume a level maintaining said specified condition.

References Cited
UNITED STATES PATENTS

| | | | |
|---|---|---|---|
| 2,571,625 | 10/1951 | Seldon | 137—501 X |
| 2,917,066 | 12/1959 | Bergson | 137—486 X |
| 2,950,733 | 8/1960 | Perkins | 137—501 X |
| 3,225,785 | 12/1965 | Goike | 137—486 |

M. CARY NELSON, *Primary Examiner.*

R. J. MILLER, *Assistant Examiner.*